Nov. 27, 1951 E. J. FARKAS 2,576,336
MULTISPEED AUTOMATIC TRANSMISSION
Filed Feb. 23, 1946 5 Sheets-Sheet 2

EUGENE J. FARKAS
INVENTOR.

ATTORNEYS.

Nov. 27, 1951      E. J. FARKAS      2,576,336

MULTISPEED AUTOMATIC TRANSMISSION

Filed Feb. 23, 1946      5 Sheets-Sheet 4

EUGENE J. FARKAS
INVENTOR.

BY

ATTORNEYS.

Patented Nov. 27, 1951

2,576,336

UNITED STATES PATENT OFFICE 2,576,336

MULTISPEED AUTOMATIC TRANSMISSION

Eugene J. Farkas, Detroit, Mich., assignor to Ford Motor Company, Dearborn, Mich., a corporation of Delaware Application February 23, 1946, Serial No. 649,617

9 Claims. (Cl. 74—645)

This invention relates generally to a transmission, and more particularly to a multispeed automatic transmission.

The present invention comprises an improvement of the automatic transmission disclosed in my copending application, Serial No. 611,975, filed October 22, 1945, now Patent No. 2,528,584, November 7, 1950. The transmission of the said copending application includes a multiple planetary gearing system adapted to transmit torque at three different speed ratios, with the transition from low to intermediate speed, and from intermediate to high speed, taking place automatically by the operation of intermediate and high speed clutches which are activated by fluid under pressure supplied by a fluid pump and regulated by governor-controlled hydraulic valve means.

An object of the present invention is to provide an automatic transmission in which an automatic shift is normally effected between three speed ratios under conditions of partial load and partial throttle, but in which other speed ratios are available for extraordinary operating conditions. The three speed ratios normally used are selected and are properly spaced from each other for the most efficient and advantageous operation of the vehicle for normal driving.

A further object of the invention is to provide means for automatically shifting the transmission from high speed down to a lower speed ratio between the normal, intermediate and high speed ratios under conditions of full load and full throttle, such as when an increase in acceleration is desired for passing other vehicles, climbing hills, etc. A second automatic kickdown to a still lower speed ratio between the normal low and intermediate speed ratios takes place automatically under still heavier load and throttle conditions, to provide still greater torque and acceleration under extreme circumstances. Although various arrangements are possible with the present invention, the construction shown permits the transmission of torque at five different speed ratios, with normal operating conditions utilizing first, third and fifth speeds automatically, and with kickdowns to fourth and second speeds taking place automatically when necessary for maximum vehicle efficiency under unusual conditions.

Another object of the invention is to provide an automatic transmission in which hydraulic control means are utilized to effect the necessary shifts between speed ratios. The upward and downward shift between the normal low, intermediate and high speed ratios are effected by means of clutches hydraulically operated by a governor-controlled slide valve, and the kickdowns to lower speed ratios are effected by hydraulic servo units controlled by a rotary hydraulic valve coupled with the accelerator pedal for automatic operation. The only manual control necessary with the present transmission is the selection of the direction of travel, for which purpose a control lever is provided, preferably upon the steering column, and is connected to a rotary hydraulic valve for placing the transmission in neutral, forward speed and reverse speed.

Still another object is to utilize a fluid coupling in the transmission and yet to effectively eliminate creep of the vehicle at idling speeds due to torque transmitted through the coupling. This result is attained by so constructing the accelerator controlled valve that no fluid pressure is supplied to the manually controlled valve at idling speeds, thus maintaining the transmission in neutral during idling regardless of the position of the manually controlled valve.

A still further object of the present invention is to provide an automatic transmission having a multiple planetary unit arranged to transmit torque at three different speed ratios for normal operation, and an underdrive planetary unit adapted to be controlled to selectively insert an added reduction, which, when compounded with the various speed ratios of the multiple planetary unit, provides additional speed ratios intermediate the normal speed ratios. In addition, means are provided for automatically increasing the oil pressure supplied to the control clutches when the added reduction of the underdrive unit is utilized, thus preventing overloading the clutches from the increased torque added by the underdrive unit.

The invention also provides for downhill operation during which the transmission is shifted to a lower speed ratio and overrunning is prevented so that the engine can be used to retard or brake the vehicle. For this purpose the manually controlled lever is shifted to an extreme position and the control of the hydraulic valves is coordinated to simultaneously shift the transmission to a lower speed ratio and to apply a brake overriding the overrunning clutch normally used in the power train.

It is also an object of the invention to provide a hydraulically controlled automatic multispeed transmission in which the fluid pressure is provided by a pair of fluid pumps, one driven by the drive shaft and the other by the load shaft, and to coordinate the action of the pumps to provide the necessary fluid pressure under the various operating conditions.

Other objects include the provision of brake bands automatically operated by hydraulic servos to condition the transmission for certain of the changes, and to provide for equalizing and balancing the braking torques. In addition, valve operating means are provided in connection with the underdrive planetary unit to lock the latter in a 1-1 ratio during normal operation and to automatically unlock the planetary unit and permit the desired reduction when a kickdown to a lower speed ratio is called for.

Still other objects and advantages of this invention will be made more apparent as this description proceeds, particularly when considered in connection with the accompanying drawings, in which.

The general construction of the entire transmission will first be briefly described, and inasmuch as certain of the parts thereof are similar to those shown and described in the above-mentioned copending application, Serial No. 611,975, filed October 22, 1945, reference is made to that application for a more detailed description thereof. The improvements incorporated in the present transmission will next be described more in detail, and the function and coordination of these added units and improvements in combination with the entire transmission will then be brought out in a detailed description of the operation of the transmission under various conditions.

Figure 1:
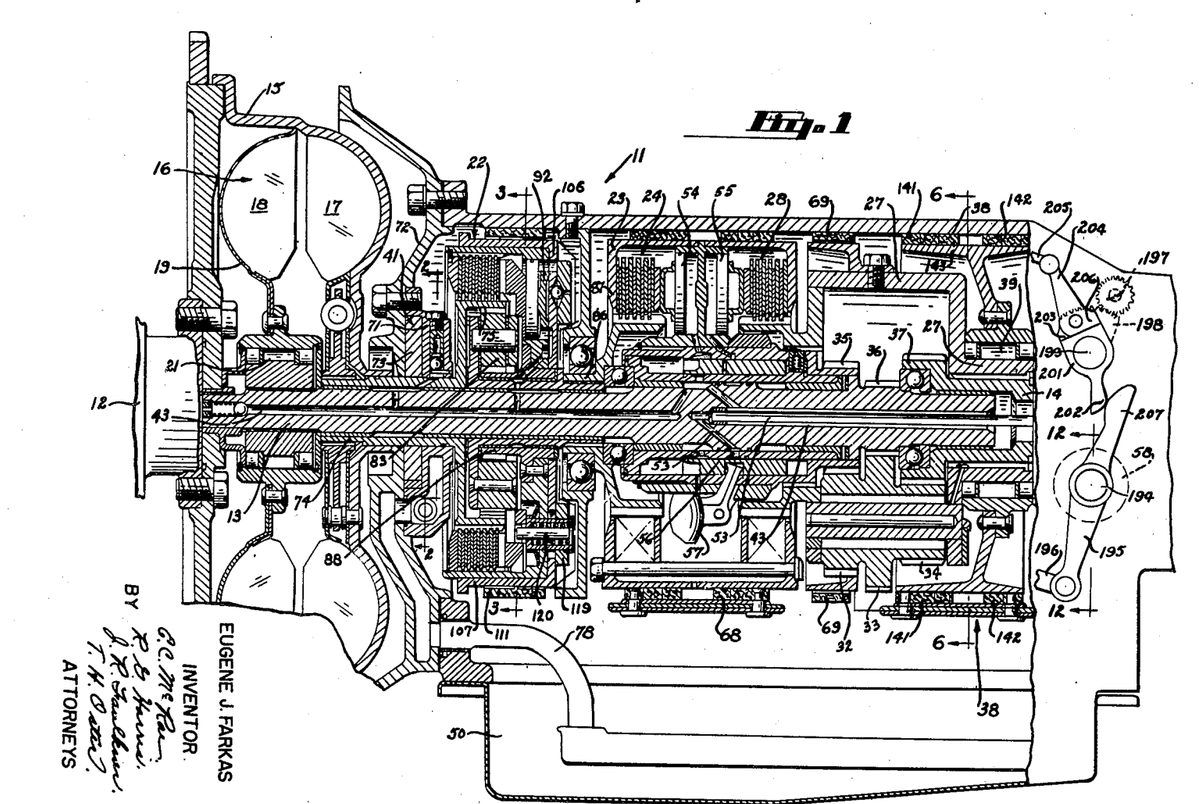
Figure 1 is a longitudinal cross-sectional view, partly in elevation, of a transmission embodying the present invention.
Figure 18:
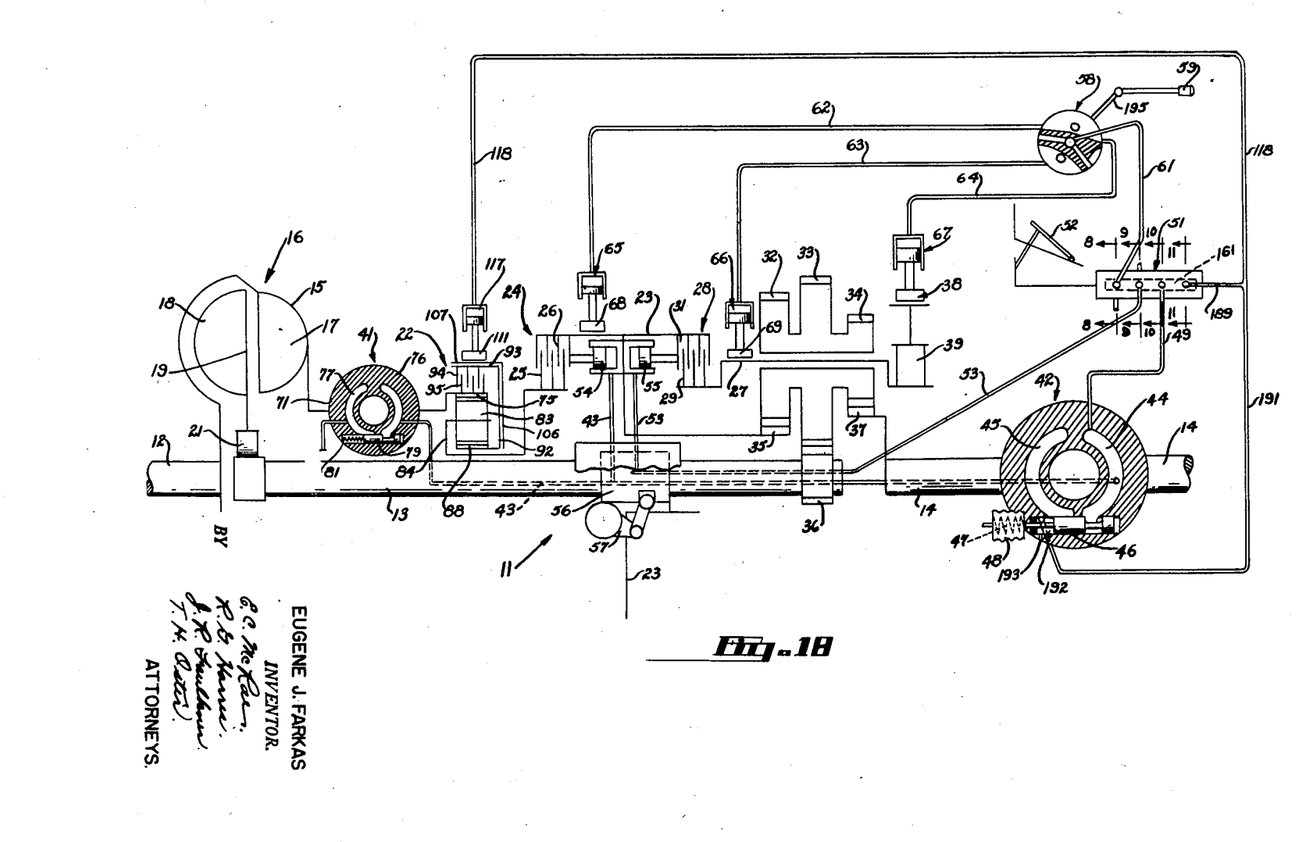
Figure 18 is a schematic view of the transmission showing diagrammatically the overall construction and the hydraulic control mechanism.

As best seen in Figures 1 and 18, the reference character 11 indicates an automatic transmission having a drive shaft 12 connected to the crank shaft of the engine, a main shaft 13, and a load shaft 14 adapted to be connected to the rear axle drive means. Attached to the drive shaft 12 is the impeller housing 15 of a fluid coupling 16. The impeller housing has a series of vanes 17 cooperating in the usual manner with the vanes 18 in the runner housing 19. The runner housing 19 is connected to the main shaft 13 by an overrunning clutch 21.

The impeller housing 15 is operatively connected to an underdrive planetary unit 22, the output of which is adapted to be operatively connected to the clutch carrier 23 by means of an intermediate speed clutch 24. The underdrive planetary unit 22 will be described more in detail later, it being sufficient here to say that the unit is provided with control means enabling it to selectively transmit torque either at a unitary ratio or at a predetermined reduction ratio. The intermediate speed clutch 24 includes clutch discs 25 and 26 connected respectively to the planetary unit 22 and the clutch carrier 23. Clutch carrier 23 is also adapted to be locked to a planet carrier 27 by means of a high speed clutch 28, the latter including clutch discs 29 and 31 respectively connected to the planet carrier 27 and the clutch carrier 23. The intermediate and high speed clutches are adapted to be actuated automatically by hydraulic mechanism to be described later.

The planet carrier 27 is mounted for rotation about the axis of the main shaft 13 and carries clusters of planet pinions 32, 33 and 34. Planet pinions 32 are adapted to mesh with a sun gear 35 carried by the clutch carrier 23, while planet pinions 33 mesh with sun gear 36 on the main shaft 13 and planet pinions 34 mesh with sun gear 37 carried by the load shaft 14.

Reverse rotation of the planet carrier 27 can be selectively prevented by means of the forward speed brake 38, operating through the overrunning clutch 39.

A pair of fluid pumps 41 and 42 are provided for supplying fluid under pressure to operate the control mechanism for the transmission. The front fluid pump 41, which will be described more in detail later, is driven by the impeller housing 15 of the fluid coupling and supplies pressure to a conduit 43 extending through the main and load shafts 13 and 14 and communicating with the pressure chamber 44 of the pump 42. The rear pump 42 is driven by the load shaft 14. Fluid from the transmission sump is admitted to the intake chamber 45 of the rear pump and delivered under pressure by the pump to the pressure chamber 44.

A pressure relief valve 46 is interposed in the housing of the pump 42 between the pressure and intake chambers 44 and 45. The head of the pressure relief valve 46 is subjected to the pressure in the pressure chamber 44, tending to move the valve to the left and to establish communication between the pressure and intake chambers 44 and 45 respectively. This movement of the relief valve by the fluid pressure is resisted by a spring 47 and an expansible chamber 48 adapted to be connected to the intake manifold of the engine. This construction is more fully described in the copending application of Eugene J. Farkas and Joseph W. Rackle, Serial No. 626,562, filed November 3, 1945, now Patent No. 2,528,585, November 7, 1950, in which it is brought out that the spring and vacuum chamber provide a control for the relief valve which modulates the latter in accordance with torque requirements, since the manifold vacuum is inversely proportional to the torque. The arrangement is such that the pressure relief valve 46 intermittently short-circuits the fluid pump by connecting the pressure and intake chambers 44 and 45, maintaining the fluid pressure at an amount which is determined by the torque requirement.

It will be noted that inasmuch as the front and rear fluid pumps 41 and 42 are interconnected by the conduit 43, they cooperate in supplying fluid under pressure to the entire hydraulic system of the transmission. Inasmuch, however, as the rear pump 42 is driven by the load shaft 14, this pump is inoperative when the vehicle is stationary, as during idling, and at this time supplies no fluid pressure to the system. The front pump 41, however, is directly driven by the drive shaft 12 through the impeller housing 15, and accordingly supplies fluid pressure to the system during idling, thus furnishing the necessary pressure to effect the hydraulic shift between neutral, reverse and forward speed, as more fully discussed hereinafter.

The pressure chamber 44 of the rear pump 42 communicates through a conduit 49 to a rotary hydraulic valve 51 which is operatively connected to the accelerator pedal 52 so as to be automatically controlled by the position of the latter. As will be described more in detail later, the valve 51 throughout its normal operating range connects the conduit 49 from the pump with a conduit 53. The conduits 43 and 53 supply fluid under pressure for operating the intermediate and high speed clutches 24 and 28 respectively, by the actuation of cylinder and piston units 54 and 55 respectively.

The flow of fluid through conduits 43 and 53 is controlled by a hydraulic sleeve valve 56, the axial position of which is regulated by a centrifugal governor 57 mounted on the clutch carrier 23. Depending upon the rotational speed, the governor 57 is effective to shift the hydraulic sleeve valve 56 between three different positions in which, respectively, both conduits 43 and 53 are blocked rendering both the intermediate and high speed clutches 24 and 28 inoperative, conduit 43 is opened actuating the intermediate speed clutch 24, and both conduits 43 and 53 are opened actuating both clutches. As will be described more in detail in connection with the operation of the transmission, the control of the hydraulic valve 56 by the governor 57 in the manner mentioned above is effective to cause the transmission to normally transmit power in one of three speed ranges (low, intermediate and high) and to automatically shift the transmission between these speed ranges in accordance with speed and torque requirements.

A second rotary hydraulic valve 58 is provided, being arranged to be manually operated by a control lever 59 preferably mounted upon the steering column for operation by the driver of the vehicle. Fluid pressure is delivered to the valve 58 from the valve 51 through the conduit 61 and is adapted to be selectively transmitted by the valve 58 through conduits 62, 63 and 64 to hydraulic servo units 65, 66 and 67. The hydraulic servo unit 65 operates a brake 68 arranged to stop the rotation of the clutch carrier 23 and to thereby place the transmission in reverse speed, as will be more completely described later. The servo unit 66 operates a brake 69 on the planet carrier 27, preventing rotation of the latter and overruling the overrunning clutch 39 when it is desired to utilize the engine torque for braking, as in downhill operation. The servo unit 67 actuates the forward speed brake 38 which places the transmission in condition for operation in the forward direction through the various speed ratios.

*Front pump 41 (Figures 1, 2 and 18)*

Figures 2, 3, 19:
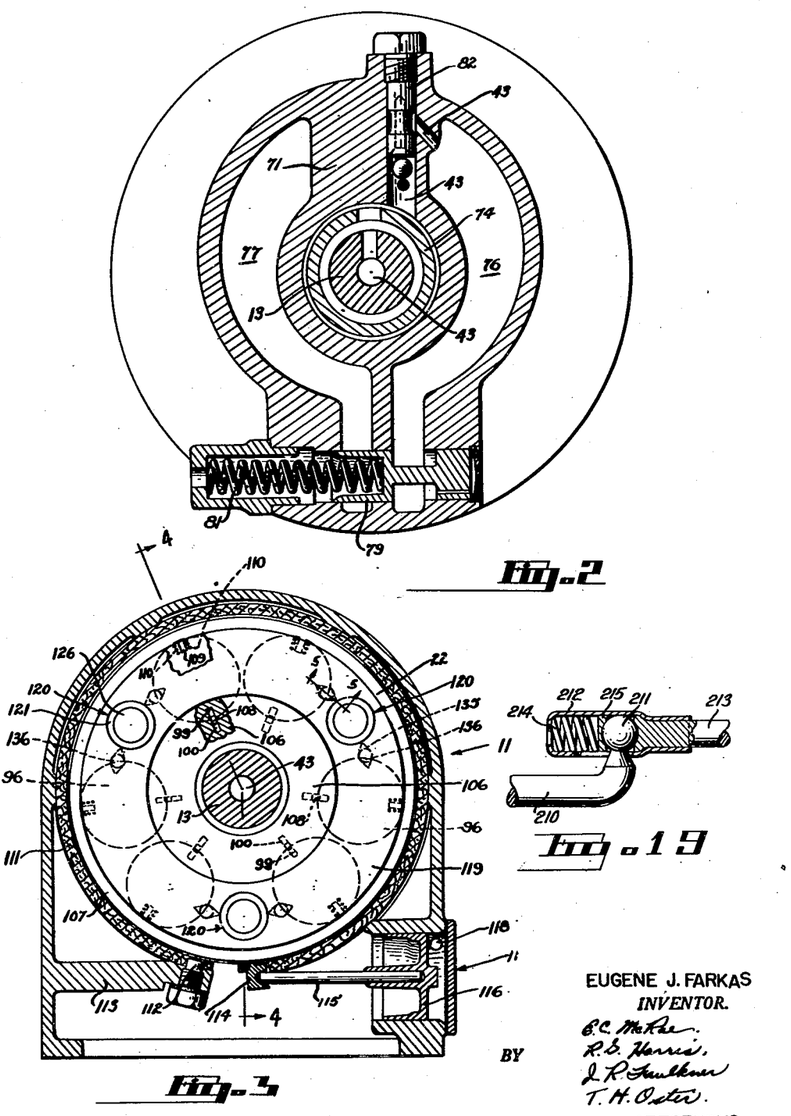
Figure 2 is a transverse cross-sectional view through the front pump taken substantially on the line 2—2 of Figure 1.
Figure 3 is a transverse cross-sectional view through the underdrive planetary unit taken substantially on the line 3—3 of Figure 1.
Figure 19 is a fragmentary cross sectional view of a coupling in the accelerator linkage.

The front pump 41 is similar in construction to the rear pump 42 but is located between the fluid coupling 16 and the underdrive planetary unit 22. The pump housing 71 is carried by the forward mounting flange 72 of the transmission casing and the pump rotor 73 is connected to the hub 74 of the internal or ring gear 75 of the planetary unit 22. Inasmuch as the hub 74 is operatively connected to the impeller housing 15 of the fluid coupling, it will be seen that the pump is directly actuated by the drive shaft 12 of the transmission. Accordingly, the pump supplies fluid pressure to the hydraulic system at all times, even during idling. Referring now to Figures 1 and 2, the pump housing 71 contains a pressure chamber 76 and an intake chamber 77, the latter being supplied with fluid from the transmission sump 50 through an intake tube 78. A pressure relief valve 79 is mounted in the pump housing 71 between the pressure and intake chambers 76 and 77, and is similar in construction to the relief valve 46 for the rear pump 42, except that movement thereof is resisted solely by a spring 81 so that the pressure in chamber 76 is maintained at a constant value, in the present instance 80 pounds per square inch.

The conduit 43 leading from the pressure chamber 76 of the pump contains a check valve 82 which is adapted to be closed by a ball when the pressure supplied by the rear pump 42 exceeds the pressure in the front pump 41. Under these conditions, the front pump temporarily short-circuits itself through the pressure relief valve 79 and the system is supplied with fluid pressure solely from the rear pump 42.

*Underdrive planetary unit 22 (Figures 1, 3, 4, 5, 18)*

The underdrive planetary unit 22, previously mentioned, is located concentrically with the main shaft 13 between the front pump 41 and the intermediate speed clutch 24. This planetary unit provides an additional reduction which can be selectively inserted into the power train under certain circumstances. As previously mentioned, the hub 74 of the ring gear 75 is connected to the impeller housing 15 of the fluid coupling and is constantly driven at engine speed. Meshing with the ring gear 75 are a plurality of planet pinions 83 carried by a planet carrier 84 having a hub 85 journaled on the main shaft 13 and splined to the hub 86 of the intermediate speed clutch supporting member 87 which carries the clutch discs 25. The sun gear 88 is journaled on the hub 85 of the planet carrier and meshes with the planet pinions 83.

The sun gear 88 has a radially outwardly extending flange 89 to which is attached by rivets 91 a clutch disc 92. At its outer periphery the clutch disc 92 has an axially extending flange 93 carrying clutch discs 94 which are arranged for frictional engagement with clutch discs 95 carried by the ring gear 75. It will be apparent that when the clutch discs 94 and 95 are moved axially into frictional engagement with each other, the ring gear 75 and the sun gear 88 are locked to each other and the planetary gear-set rotates as a unit, transmitting power from the drive shaft 12 to the intermediate speed clutch 24 at a unitary or 1-1 ratio. When, however, the clutch discs 94 and 95 are separated, and the sun gear 88 is held against rotation, a speed reduction is effected from the ring gear 75 to the planet carrier 84 through the planet pinions 83.

Figures 4, 5, 6, 7:
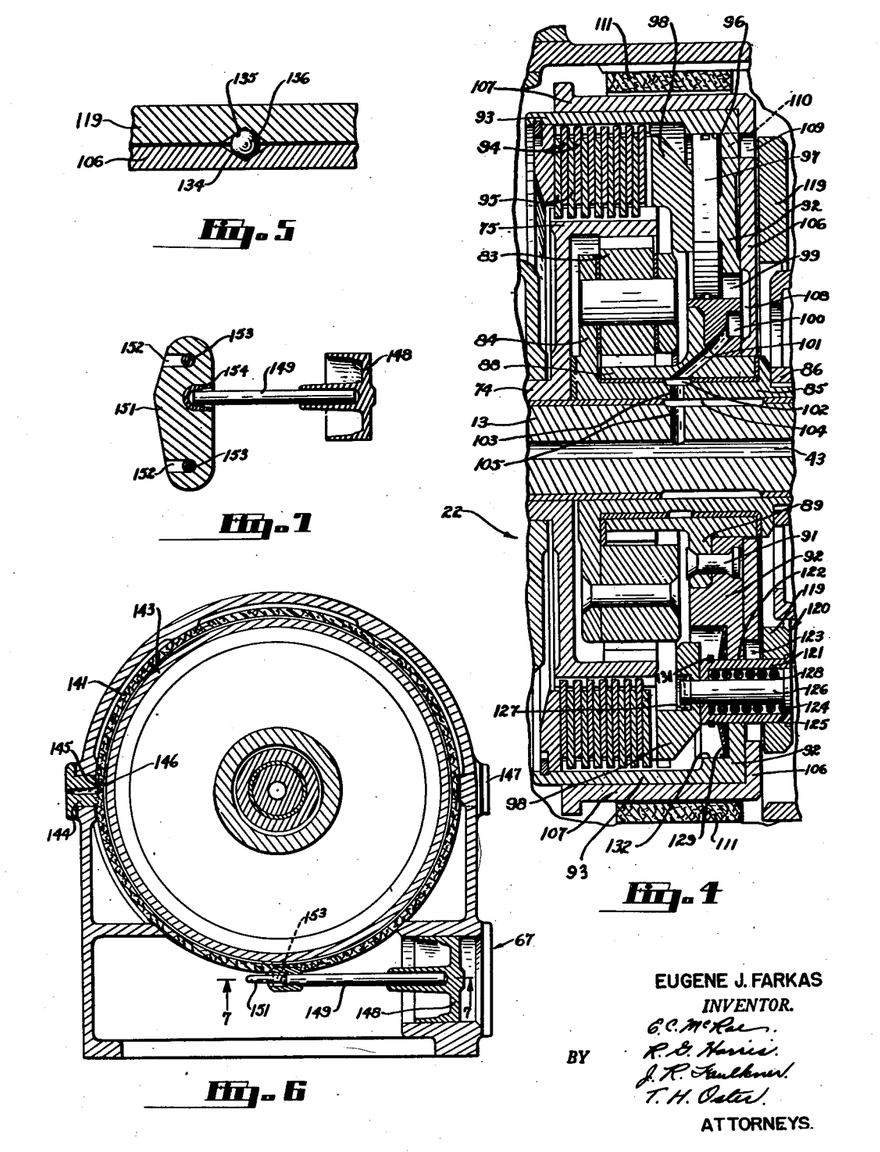
Figure 4 is a longitudinal cross-sectional view taken substantially on the line 4—4 of Figure 3.
Figure 5 is a fragmentary cross-sectional view taken substantially on the line 5—5 of Figure 3.
Figure 6 is a transverse cross-sectional view through the forward speed brake, taken substantially on the line 6—6 of Figure 1.
Figure 7 is a cross-sectional view taken substantially on the line 7—7 of Figure 6.

The clutch disc 92, Figures 3 and 4, is formed with six angularly spaced axially extending cylinders 96 adjacent its periphery, within which are reciprocably mounted pistons 97 arranged to exert force through the actuating ring 98 to the clutch discs 94 and 95. An intake port 99 is provided in the clutch disc 92 for each of the cylinders 96. Spaced radially inwardly from each of the intake ports 99 is a supply port 100 communicating by means of a passage 101 with an annular groove 102 extending around the periphery of the hub 85. A radial passage 103 through the hub 85 connects the groove 102 with an annular groove 104 in the main shaft 13, the latter groove being connected by a radial passage 105 to the conduit 43.

A clutch valve 106, in the form of a disc, is positioned adjacent the rearward face of clutch disc 92 and has an axial flange 107 extending from its periphery and forming a brake drum. Clutch valve 106 is provided with a plurality of radially extending cavities 108, one for each of the cylinders 96. As best seen in Figure 4, in one angular position of the clutch valve relative to the clutch disc, the cavities 108 establish communication between the supply ports 100 and the intake ports 99 in the clutch disc 92. In this position fluid pressure is supplied to the cylinders 96 and the clutch discs 94 and 95 are engaged, locking the planetary unit.

It will be noted that the cavities 108 and the ports 99 and 100 are narrow in a circumferential direction, and that a relatively small angular movement of the clutch valve 106 relative to the clutch disc 92 is effective to break the communication between the ports 99 and 100 and shut off the fluid supply to the cylinders. An angular movement of this extent is also effective to establish communication between a radially extending port 109 formed in the clutch valve 106 and one of the series of exhaust ports 110 in the clutch disc 92. The cylinders 96 are now open to atmosphere and are exhausted, disengaging the clutch discs 94 and 95.

The relative angular movement between the clutch valve 106 and clutch disc 92, required to cut off the supply of fluid to the cylinders 96 and to exhaust the latter, is effected by means of an external brake band 111 surrounding the brake flange 107 of the clutch valve 106. Referring now to Figure 3, the brake band 111 extends circumferentially of the brake flange 107 and has one end anchored by means of a stud 112 to the rib 113 extending inwardly from the transmission casing. The opposite end of the brake band carries a socket 114 adapted to receive one end of a piston rod 115 extending from the piston 116 of a hydraulic servo unit 117. Fluid under pressure to actuate piston 116 and frictionally engage the brake band with the brake flange is supplied through a conduit 118 from the accelerator operated valve 51 in a manner to be more fully described later.

A clutch ring 119 is mounted upon and carried by the clutch disc 92 by means of three angularly spaced supporting units 120, Figure 4. Each supporting unit 120 comprises a hollow sleeve 121 extending through an aperture 122 in the clutch disc 92 and an enlarged opening 123 in the clutch valve 106. The sleeve passes through a counterbored hole 124 in the clutch ring 119 and is provided with a head 125 engaging the ring. A pin 126 extends through the sleeve 121 and is secured at its forward end to the actuating ring 98 by means of a cross pin 127. A coil spring 128 surrounds the pin 126 and extends between the head of the pin and the inner end of the sleeve 121, and is effective to move the actuating ring 98 of the clutch to its released position. A Belleville washer 129 surrounds the sleeve 121 between a retaining ring 131 on the sleeve and the bottom of the counterbore 132 formed in the clutch disc 92.

The clutch disc 92 and the clutch valve 106 are normally held in a predetermined angular relationship in which the cavity 108 in the valve is in alignment with the ports 99 and 100 in the disc. This is accomplished by an aligned series of conical recesses 134 and 135 in the clutch valve 106 and clutch ring 119 respectively. Balls 136 are located in the aligned recesses and cause axial separation of the valve 106 and ring 119 upon relative angular movement therebetween. This separation is initially resisted by the coil springs 128 and subsequently by both the coil springs 128 and the Belleville washers 129, which cushion and stop the relative angular movement between the valve and ring before the sleeves 121 bottom on the sides of the enlarged openings 123 in the valve 106.

The operation of the unit will be described more in detail later, but it is noted here that with the brake 111 disengaged from the brake flange 107 of the clutch valve 106, the clutch valve and the clutch disc 92 rotate together as a unit with the cavity 108 in alignment with the intake ports 99 and 100 to engage the clutch plates 94 and 95 and lock the ring gear 75 and the sun gear 88 together so that the unit will transmit torque at a unitary ratio. Application of the brake 111 causes relative angular movement between the clutch disc 92 and clutch valve 106, releasing the clutch plates and holding the sun gear 88 stationary so that the unit will transmit torque at a reduced ratio.

*Servo operated brakes (Figures 1, 3, 6 and 7)*

The construction of the servo operated brake mechanism for the underdrive planetary unit 22 is shown in Figure 3 and has been previously described. The construction of the downhill brake 69, actuated by the servo unit 66, is identical in construction with the brake for said planetary unit 22, and accordingly will not be described in detail.

The forward speed brake 38 and the reverse speed brake 68 carry a considerably greater load than either the planetary brake 111 or the downhill brake 69 and consequently must be constructed to provide greater brake action. Inasmuch as these two brakes are identical in construction, only the forward speed brake 38 will be described in detail. This brake is best shown in Figures 1, 6 and 7 and comprises a pair of axially spaced brake bands 141 and 142 encircling the brake drum 143 which is connected through the over-running clutch 39 to the planet carrier 27. To provide the necessary brake friction area and also a self-energizing effect, each of the brake bands 141 and 142 comprises a plurality of convolutions. The forward brake band 141 consists of 2¾ convolutions and the rearward brake band 142 has 2¼ convolutions. With this arrangement the ends of the brake bands can be anchored at diametrically opposite points to balance the torque reaction forces. The anchor for the brake band 141 comprises a stud 144 mounted in the transmission housing and having internal teeth 145 engageable with teeth 146 on the end of the brake band. In a similar manner the end of brake band 142 is anchored at a diametrically opposite point to the transmission casing by means of an anchor 147.

The actuating means for the brake bands comprises the hydraulic servo unit 67, the piston 148 of which is connected by a piston rod 149 to an equalizing lever 151, Figure 7. Grooves 152 are formed in opposite ends of the equalizing lever to receive studs 153 carried by the free ends of the brake bands 141 and 142. It will be noted that the socket 154 which receives the thrust of the piston rod 149 is positioned off-center, to apply a greater actuating force to the short brake band 142 than to the long brake band 141, thus equalizing the braking action of the two brake bands.

If desired, bi-metal bands may be used, such as copper plated steel brake bands, to provide friction surfaces in which the wear is minimized and the braking action smooth. The brake bands possess sufficient inherent resiliency to disengage themselves from the brake drums when released and since the wear is slight, the travel of the pistons in the servo units is sufficient to eliminate the necessity for adjusting the brake bands in operation. This increases the reliability of the transmission and simplifies maintenance.

*Hydraulic control mechanism (Figures 8-18 inclusive)*

Reference is now made to Figures 8 to 18 inclusive, which illustrate the hydraulic control mechanism for the transmission. The two fluid pumps 41 and 42, the governor-controlled hydraulic sleeve valve 56 and the hydraulic actuating units 54 and 55 for the intermediate and high speed clutches 24 and 28 have already been described.

Figure 10:
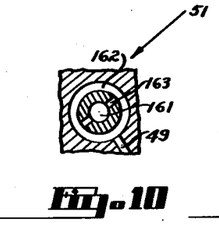

The principal control functions are centralized in a pair of rotary valves 51 and 58. The position of the rotary valve 51 is controlled by the accelerator pedal 52. As best seen in Figures 10 and 18, the valve 51 is provided with a central bore 161 which is connected at all times to the pressure chamber 44 of the pump 42 by means of the conduit 49 extending from the pump and communicating with the annular groove 162 in the valve, which in turn is connected by a radial port 163 with the central bore 161. Thus the accelerator controlled valve 51 is pressurized at all times.

Figure 8:
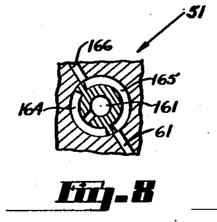
Figures 8, 9, 10 and 11 are transverse cross-sectional views through the accelerator controlled valve taken substantially on the lines 8—8, 9—9, 10—10 and 11—11 respectively of Figure 18.

Referring now to Figure 8, in which the valve 51 is shown in idling position, it will be noted that the pressure within the bore 161 of the valve communicates with a groove 164 extending part way around the periphery of the valve, but that communication is blocked between the groove 164 and the conduit 61 extending to the manually controlled valve 58. Groove 165 extends part way around the opposite side of the valve 51 and during idling position establishes communication between conduit 61 and an exhaust passage 166 opening into the interior of the transmission casing at atmospheric pressure. Thus, the valve 58 is not pressurized during idling and, as will be seen later, this places the transmission in neutral preventing creep due to power transmitted through the fluid coupling.

Figure 12:
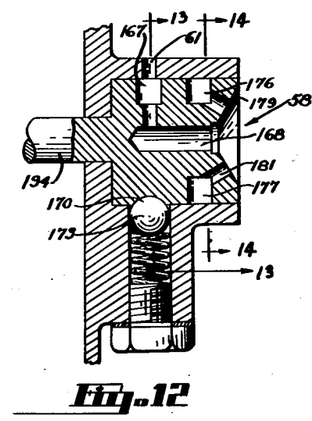
Figure 12 is an axial cross-sectional view through the manually controlled valve, taken substantially on the line 12—12 of Figure 1.
Figure 13:
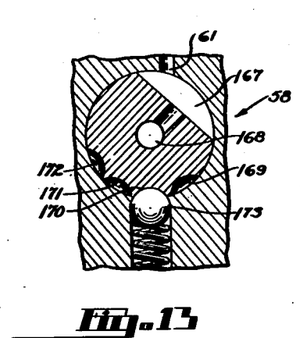
Figures 13 and 14 are transverse cross-sectional views taken substantially on the lines 13—13 and 14—14 respectively of Figure 12, with the manually controlled valve in neutral position.
Figure 14:
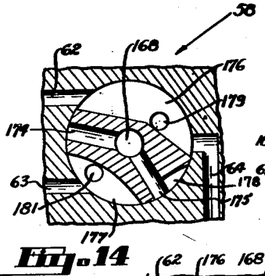

The initial movement of the accelerator pedal rotates the valve 51 in a counterclockwise direction and establishes communication between the groove 164 and the conduit 61 to supply fluid pressure to valve 58. As best seen in Figures 12 and 13, valve 58 is provided with an intake groove 167 establishing communication between conduit 61 and a central axially extending bore 168 in the valve 58. Valve 58 is also formed on its periphery with a series of circumferential detents 169, 170, 171 and 172 engageable with a spring pressed ball 173 to index the valve between four different angular positions.

It will be noted from an examination of Figures 12 and 14 to 17 inclusive that the center bore 168 of the valve 58 communicates with a pair of radial passages 174 and 175, and that the valve is formed with transverse grooves 176 and 177 on opposite sides of the passages. The outer end of the passage 175 is enlarged at 178, and the transverse grooves 176 and 177 communicate with the interior of the transmission casing through exhaust ports 179 and 181 respectively.

As will be described more in detail in connection with the operation of the transmission, the valve 58 is angularly rotated under the control of the manual control lever 59 to selectively establish communication between its pressurized center bore 168 and the conduits 62, 63 and 64 leading respectively to the reverse speed servo unit 65, the downhill servo unit 66, and the forward speed servo unit 67.

Figure 9:
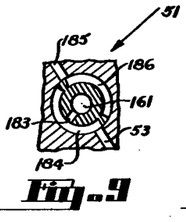

With reference now to the accelerator operated valve 51, and particularly to Figures 9 and 18, it will be noted that the central pressurized bore 161 of the valve communicates through a radial passage 183 to a circumferential groove 184 which, during the normal range of the accelerator, communicates with the conduit 53 leading to the hydraulic actuating unit 55 for the high speed clutch 28. It will be seen, however, that a sufficient angular movement of the valve in a counterclockwise direction will be effective to cut off communication between the pressurized bore 161 and the high speed clutch conduit 53 and to connect the latter to the exhaust passage 185 through the circumferential groove 186.

Figure 11:
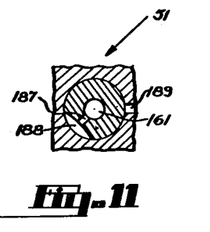

With reference to Figures 11 and 18, the pressurized bore 161 of the valve 51 communicates with a radial passage 187 having an enlarged outer end 188. Counterclockwise rotation of the valve 51 is effective to align the enlarged outer end 188 of the radial passage 187 with a conduit 189 having branches 118 and 191. Branch conduit 118 supplies fluid pressure to the servo unit 117 which is arranged to energize the brake 111 for the underdrive planetary unit 22. As previously described, actuation of brake 111 is effective to unlock the planetary gearset and enable the latter to transmit power at a reduction ratio. This interposed reduction subjects the hydraulic actuating units 54 and 55 for the intermediate and high speed clutches 24 and 28 to a higher torque. To supply the necessary additional fluid pressure to the hydraulic units 54 and 55 so that the intermediate and high speed clutches 24 and 28 can properly carry the additional torque, branch conduit 191 leads to the chamber 192 formed in the housing of the rear pump 42 in back of the relief valve 46. An outlet port 193 is provided to exhaust the chamber 192. By properly proportioning the size of the inlet and outlet for the chamber 192, a predetermined pressure can be applied to the relief valve to supplement the spring 47 and to increase the pressure in the pressure chamber 44 of the pump.

Reference is now made to Figure 1 which illustrates the actuating means for the valves 51 and 58. The shaft 194 of the valve 58 carries a lever 195 connected by linkage 196 to the manual control lever 59 mounted upon the steering column. The valve 51 is provided at one end with a concentric pinion 197 adapted to be engaged by a quadrant 198 which is mounted upon the shaft 199 journaled in the transmission housing. An arm 201 is secured to shaft 199 and is formed at one end with a cam 202 and at its opposite end with a groove 203 receiving one end of a bell crank lever 204 pivotally mounted on the arm. The free end of the bell crank lever 204 is connected by a link 205 to the accelerator pedal 52. Depression of the accelerator pedal moves the link 205 in compression to rotate the bell crank lever 204 and, through its lever arm 206, the arm 201.

The operating lever 195 for the valve 58 has an extension 207 forming a cam engageable with the cam 202 on the lever 201 to provide interrelated movement of the valves 51 and 58 during downhill operation.

Operation

The present transmission can be considered wholly automatic during normal operation, since the transition between the various speed ratios is effected automatically, being controlled by the governor-controlled sleeve valve 56 and the accelerator controlled rotary valve 51. The only manual control necessary is the operation of the movement of the rotary valve 58 to select the direction of travel and to obtain downhill braking.

As illustrated in the drawings and described above, the multispeed transmission has five forward speeds and one reverse speed. The following forward speed ratios have been found satisfactory and will be noted for purposes of illustration:

1st—3.48–1
2nd—2.36–1
3rd—1.68–1
4th—1.41–1
5th—1–1

During normal vehicle operation in forward speed only first, third and fifth (also called low, intermediate and high) are used. These ratios are selected for maximum performance and efficiency and are properly spaced from each other to provide smooth operation and maximum performance. Fourth speed represents the first kickdown speed ratio, which is automatically utilized when additional acceleration beyond that available in high is needed. An automatic kickdown to the second speed ratio is effected when still additional acceleration is required, and in addition this speed ratio is utilized for downhill braking.

Thus, although the transmission has five forward speed ratios, only three are used during normal operation and the other two are brought into operation when unusual conditions or circumstances require speed ratios not included in the normal operating range. The transmission thus is flexible in operation and provides at all times the proper speed ratio for the most efficient and satisfactory performance.

Neutral

During idling the accelerator controlled valve 51 connects the manually controlled valve 58 to the exhaust, as shown in Figure 8. In this position of valve 51 the exhaust passage 166 is connected by the circumferential groove 165 to the conduit 61 leading to valve 58 and communicating with the central bore 168 through the groove 167, Figure 13. Since the manually controlled valve 58 is thus not pressurized, it can supply no fluid pressure to the hydraulic servo units and the transmission remains in neutral, regardless of the position of the control handle 59 located on the steering column. This arrangement is advantageous since it effectively prevents creep due to the torque transmitted through the fluid coupling 16 at engine idling speeds. For example, when the vehicle is brought to a temporary stop, the control handle 59 is normally not shifted from its forward speed position, but since the supply of pressure is cut off from the valve 58, the transmission remains in neutral, preventing creep. When the accelerator pedal has been advanced slightly, the valve 51 is rotated in a counterclockwise direction, Figure 8, again supplying pressure to the valve 58 from the pressurized bore 161 and through the circumferential groove 164 to the conduit 61.

The front pump 41, being directly driven by the drive shaft 12, generates fluid pressure even when the vehicle is stationary and the pump 42 on the road shaft 14 is inoperative, thus supplying fluid pressure to the system and making it possible to operate the hydraulic servo brakes to shift between neutral, reverse and forward speed.

First or low

In low speed, the governor-controlled hydraulic sleeve valve 56 blocks the flow of fluid through conduits 43 and 53 and accordingly neither the intermediate speed clutch 24 nor the high speed clutch 28 are operated. Power is transmitted from the drive shaft 12 through the fluid coupling 16 to the main shaft 13, and then through the sun gear 36, planet pinions 33 and 34, and the sun gear 37 to the load shaft 14, driving the latter in the forward direction in the first or low speed ratio of 3.48–1.

Third or intermediate

The transmission is automatically shifted to intermediate speed upon a predetermined increase in the rotational speed of the clutch carrier 23. This increase in speed results in radial displacement of the centrifugal governor 57 and axial movement of the hydraulic sleeve valve 56, opening conduit 43 and admitting fluid under pressure to the hydraulic actuating unit 54 to operate the intermediate speed clutch 24. Operation of the clutch frictionally engages clutch plates 25 and 26, locking the planet carrier 84 of the underdrive planetary unit 22 to the clutch carrier 23.

As previously described, the underdrive planetary unit 22 is arranged to tansmit torque at a unitary or 1–1 ratio except when the hydraulic servo unit 117 is applied, at which time a reduction of 1.41–1 is interposed in the power train. With reference to Figure 11 it will be seen that during normal operating conditions from 0 to 90% throttle, the accelerator controlled valve 51 maintains the hydraulic servo unit 117 for the planetary unit inoperative, since the counterclockwise rotation of the valve 51 corresponding to a movement of the accelerator pedal through 90% of its range is necessary to establish communication between the pressurized passage 188 and the conduit 189 leading to the hydraulic servo unit 117.

With the hydraulic servo unit 117 inoperative and the brake 111 disengaged from the brake flange 107 of the clutch valve 106, the spring tensioned supporting unit 120 maintains the clutch disc 92 and the clutch valve 106 in their neutral angular position relative to each other, as shown in Figure 3, in which position fluid pressure from the pump supply conduit 43 communicates with the clutch cylinders 96 through passages 105, 104, 103, 102, 101, port 100, cavity 108 and intake port 99. The pistons 97 are actuated to frictionally engage clutch plates 94 and 95 to lock the ring gear 75 to the sun gear 88 through the clutch disc 92. With the planetary unit thus locked, power is transmitted at a unitary ratio from the drive shaft 12 to the clutch carrier 23. The clutch carrier 23 drives sun gear 35 carried thereby, and, through planet pinions 32 and 34 and sun gear 37, is effective to rotate the load shaft 14 at the intermediate or third speed ratio of 1.68–1.

Fifth or high

When the rotational speed of the clutch carrier 23 has increased a further predetermined amount the governor-controlled hydraulic valve 56 is shifted to a position establishing fluid communication through conduit 53 to the hydraulic actuating unit 55. The latter actuates the high speed clutch 28 and frictionally engages clutch plates 29 and 31 to lock the clutch carrier 23 to the planet carrier 27 of the multiple planetary unit. Since the gear 35 is carried by the clutch carrier, this results in the rotation as a unit of the clutch carrier, planet carrier, and triple planetary pinion.

Inasmuch as the hydraulic servo unit 117 for the underdrive planetary unit is still inoperative, the planetary unit 22 remains in a locked condition, transmitting torque at a 1–1 ratio. Accordingly, a direct drive is established from the drive shaft 12 to the load shaft 14, transmitting torque at engine speed in the forward direction.

Reverse

Figure 15:
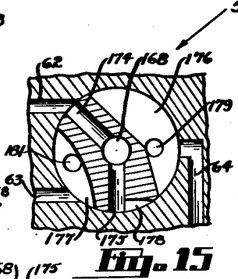
Figure 15 is a section similar to Figure 14 but showing the valve in reverse position.
Figure 16:
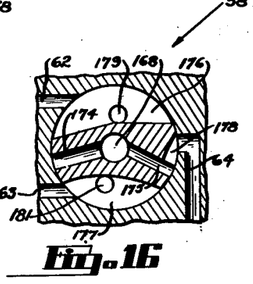
Figure 16 is a section similar to Figure 14, but showing the valve in forward speed position.

To effect reverse operation, the control handle 58 is shifted to move the valve 58 to its reverse position, establishing fluid communication from the pressurized bore 168 of the valve 58, as seen in Figure 15, through the radial passage 174 to the conduit 62 leading to the hydraulic servo unit 65 for the reverse speed brake 68, applying the latter to the clutch carrier 23. The drive is now taken from the drive shaft 12 through the fluid coupling 16 to the main shaft 13, driving the sun gear 36 carried thereby and the planet pinions 33, and also the planet pinions 32 and 34 which are integral therewith. Inasmuch as the forward speed brake is now released so that the planet carrier 27 is free of the restraint of the overrunning clutch 39, and the reverse speed brake 68 is engaged locking the clutch carrier 23 and its sun gear 35, the gearing now functions as a planetary and reverse rotation is imparted to the load shaft 14 through planet pinions 34 and the sun gear 37.

Fourth or first kick-down

For maximum performance, certain operating conditions require immediate acceleration greater than that which may be available in the fifth or high speed ratio. This may occur for example when climbing hills or passing other vehicles. Under these circumstances, a kick-down to a lower speed ratio is effected by an increased angular position of the accelerator or throttle.

With reference again to Figure 11, it will be seen that a 90% throttle movement rotates the accelerator controlled valve 51 in a counterclockwise direction to establish communication between the pressurized central bore 161 of the valve and the hydraulic servo unit 117 for the planetary unit 22, through the passages 187 and 188 and conduits 189 and 118.

Referring now to Figures 3, 4 and 5, the piston 116 of the hydraulic servo 117 is actuated to apply the brake band 111 to the braking flange 107 of the clutch valve 106. The retardation of the clutch valve 106 by the brake effects a relative angular movement between the valve 106 and the rotating clutch disc 92 which results in axial movement of the clutch ring 122 due to the camming action between the balls 136 and the conical recesses 134 and 135 in the valve and ring respectively. This axial movement is resisted first by the coil spring 128 and finally the Belleville washer 129. The arrangement is such that the relative angular movement is sufficient to cause the cavity 108 in the clutch valve 106 to break the fluid communication between the supply port 100 and the intake port 99 in clutch disc 92, and at the same time to open the clutch cylinders 96 to exhaust through the exhaust ports 109 and 110. The resulting disengagement of the clutch plates 94 and 95 releases the ring gear 75 from locking engagement with the sun gear 88.

It will be noted, however, that the sun gear 88 is held against rotation by the frictional engagement between the clutch disc 92 and clutch valve 106, the latter being locked by the brake 111. With the sun gear 88 stationary, power is transmitted through the planetary unit from the ring gear 75 to the planet carrier 84 at the reduction ratio of 1.41 to 1. This reduction ratio is interposed in the transmission power train, and since the intermediate and high speed clutches 24 and 28 remain applied, the balance of the transmission is still transmitting torque at a unitary or 1–1 ratio. As a result, the transmission now transmits torque at a 1.41–1 ratio representing fourth speed, which is a ratio between the intermediate or third speed ratio of 1.68 and the direct drive of fifth or high speed. This provides the proper speed ratio for maximum performance under conditions requiring additional acceleration beyond that obtainable in high speed, without reducing the ratio to intermediate speed, which under certain circumstances would detract from the smoothness and efficiency of operation of the vehicle.

The insertion of the speed reduction and torque multiplication of the planetary unit 22 into the transmission power train imposes a greater load upon the intermediate and high speed clutches 24 and 28. To provide for this additional load upon the clutches, means are provided for increasing the fluid pressure in the system As best seen in Figures 11 and 18, rotation of the valve 51 to the position necessary to connect the pressurized bore 161 of the valve to the conduit 189 to actuate the servo unit 117 for the planetary unit 22 is effective to simultaneously supply fluid pressure to the branch conduit 191 leading to the chamber 192 in back of the pressure relief valve 46 for the rear pump 42. This pressure supplements the resistance of spring 47 and retards the operation of the relief valve until a higher pressure in the pressure chamber 44 is reached. By properly proportioning the size of the conduit 191 and the exhaust port 193 from the chamber 192, the pressure increase is regulated to obtain a maximum of 112 pounds per square inch, in comparison with the 80 pounds per square inch normally utilized under full load. This increase in pressure is sufficient to compensate for the 41% increase in torque imposed upon the clutches by the torque multiplication of the planetary unit 22. This increased pressure is prevented from reaching the pressure chamber 76 of the front valve 41 by the check valve 82, Figure 2, to prevent the increased pressure from being dissipated through the pressure relief valve 79 of the front pump, which is arranged to provide a constant maximum pressure of 80 pounds per square inch.

*Second or second kick-down*

Under certain extreme operating conditions, it may be desirable to utilize a still lower speed ratio, between the normal low and intermediate speed ratios. In the present transmission this can be effected automatically by a depression of the accelerator pedal beyond its normal 100% or full throttle position. Movement beyond this position is possible by extension of the spring loaded couplings conventionally used in the connecting linkage. A coupling of this character is shown in Figure 19 in which the link 210 (connected to the carburetor, not shown) has a ball shaped end 211 received within a sleeve 212 carried at the end of link 213 (connected to the accelerator pedal, not shown). Spring 214 and washer 215 normally hold the link in the relative position shown, yet permit the link to be extended when the accelerator pedal is completely depressed and sufficient force is applied thereto.

It will be seen from an examination of Figure 11 that the enlarged outer end 188 of the radial passage 187 in the valve 51 maintains communication between the pressurized bore 161 and the conduit 189 to the hydraulic servo unit 117 for the planetary unit 22 when the valve has been additionally rotated in a counterclockwise direction by movement of the accelerator pedal to a position between 100 and 110% throttle. Thus the 1.41-1 ratio of the planetary unit 22 is maintained in the power train.

Referring to Figure 9, it will be seen that counterclockwise rotation of the valve 51 is effective to finally cut off the supply of fluid pressure from the pressurized bore 161 to the conduit 53 leading to the hydraulic actuating unit 55 for the high speed clutch 28, and to connect the conduit 53 to the exhaust passage 186. The resulting release of fluid pressure from the hydraulic actuating unit 55 releases the high speed clutch 28 and frees the planet carrier 27 from locking engagement with clutch carrier 23.

The effect of the disengagement of the high speed clutch 28 is to cause the multiple planetary unit of the transmission to revert to its intermediate or third speed relationship, at which time that portion of the transmission transmits torque at a 1.68-1 ratio. Inasmuch, however, as the planetary unit 22 is now transmitting torque at a 1.41-1 reduction ratio, the resulting speed ratio of the entire transmission is 2.36-1, due to combining the 1.68-1 and 1.41-1 ratios previously mentioned.

*Downhill operation*

Figure 17:
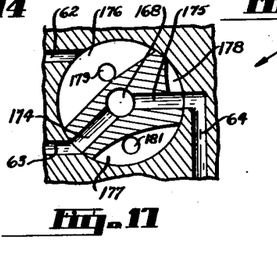
Figure 17 is a section similar to Figure 14 but showing the valve in downhill position.

From a safety standpoint and to comply with certain State laws, means are provided to permit the vehicle engine to operate through a reduced speed ration and to retard the vehicle speed during downhill operation. In the present instance it has been found desirable to utilize the second speed ratio of 2.36-1 as the downhill braking ratio. Accordingly, it is necessary to rotate the accelerator controlled valve 51, Figures 9 and 11, through an angle equivalent to that rotated during 100-110% throttle, to cut off the supply of pressure to the high speed clutch 28 and to apply the hydraulic servo unit 117 for the planetary unit 22, thus placing the transmission in the same operating relationship as described above in connection with the kickdown to second speed ratio. In addition, the overrunning clutch 39 on the planet carrier 27 must be overruled to prevent the transmission load shaft from overrunning the drive shaft. This is accomplished by a manual operation of the control handle 59 on the steering column to rotate the valve 58 to the downhill position as shown in Figure 17, in which the pressurized bore 168 of the valve is connected through the radial passage 174 to the conduit 63 leading to the hydraulic servo unit 86. Actuation of the latter is effective to apply the downhill brake 69 to the planet carrier 27 to lock the latter against rotation and overrule the overrunning clutch 39.

It will be noted from an examination of Figure 17 that the valve 58 is so designed that in its downhill position communication is maintained between the pressurized bore 168 and the conduit 64 to the forward speed servo unit 67 to maintain the forward speed brake 38 applied. This conditions the transmission for an immediate return to its normal automatic operation between low, intermediate and high speed ratios.

Reference is made to Figure 1 to illustrate the manner in which the operation of valves 51 and 58 are coordinated to simultaneously apply the downhill brake 69 and to shift the transmission to the second speed ratio, without interfering with the normal operation of valve 51 by the accelerator pedal. In this figure the operating lever 195 for the valve 58 is shown in its forward speed position and the operating arm 201 for the valve 51 in its idling or 0% throttle position. It will be apparent that operation of the accelerator pedal to move the link 205 to the right rotates the arm 201 in a clockwise direction away from the cam 207 carried by the lever 195.

When downhill operation is desired, the lever 195 is moved in a counterclockwise direction by the steering column control handle 59. This results in rotating arm 201 in a clockwise direction through the engagement of the cam 202 by the cam 207, and this is accomplished without disturbing the position of the accelerator or throttle since the arm 201 is free to move away from the lever arm 206 of the bell crank 204 in the accelerator linkage. The rotation of arm 201 effects a rotation of valve 51 through the interconnecting quadrant 198 and pinion 197, to move the valve to the position previously mentioned in which the high speed clutch 28 is rendered inoperative and the servo unit 117 for the planetary unit 22 is actuated.

It will be understood that the invention is not to be limited to the exact construction shown and described, but that various changes and modifications may be made without departing from the spirit and scope of the invention, as defined in the appended claims.

What is claimed is:

1. In a variable speed power transmission, in combination, a power shaft, an intermediate shaft, a load shaft, a multiple planetary gearing system between said intermediate and load shafts comprising planet pinions mounted on a planet carrier rotatably supported about the axis of the intermediate shaft and respectively meshing sun gears, means associated with said multiple planetary gearing system automatically operable under predetermined conditions of speed to change from one ratio to another, a single planetary gearset between said power shaft and said multiple planetary gearing system, a clutch arranged to lock two of the elements of said single planetary gearset together, fluid pressure means for controlling said clutch, a source of fluid pressure, a valve rotatable with one of said elements and controlling the flow of fluid from said source to said fluid pressure means, and means shifting said valve relative to said last-mentioned element to alter the operation of said clutch.

2. In a variable speed power transmission, in combination, a power shaft, an intermediate shaft, a load shaft, a multiple planetary gearing system between said intermediate and load shafts comprising planet pinions mounted on a planet carrier rotatably supported about the axis of the intermediate shaft and respectively meshing sun gears, means associated with said multiple planetary gearing system automatically operable under predetermined conditions of speed to change from one ratio to another, a single planetary gearset between said power shaft and said multiple planetary gearing system, said planetary gearset having three elements including a ring gear, a planet carrier supporting planet pinions, and a sun gear, means connecting one of said elements to said power shaft, means connecting another of said elements to said multiple planetary gearing system, a clutch arranged to lock two of the elements of said single planetary gearset together, fluid pressure means for controlling said clutch, a source of fluid pressure, a valve normally rotatable with one of said elements and arranged to admit fluid to said fluid pressure means, and means effecting a relative rotation between said valve and said last-mentioned element to interrupt the flow of fluid to said fluid pressure means.

3. In a power transmitting mechanism, ring and sun gear elements, a planet carrier element supporting planet pinions meshing with said ring and sun gear elements, a clutch arranged to lock two of said elements together, fluid pressure means for applying said clutch, a source of fluid pressure, a rotatable valve concentrically mounted with respect to said elements and arranged to control the flow of fluid from said source to said means, means associated with said valve normally effecting a rotation thereof with one of said elements, and means retarding the rotation of said valve to effect a relative angular movement between said valve and said last-mentioned element to render said fluid pressure actuating means inoperative and to release said clutch.

4. In a power transmitting mechanism, ring and sun gear elements, a planet carrier element supporting planet pinions meshing with said ring and sun gear elements, a clutch arranged to selectively lock two of said elements together, fluid pressure actuating means supported upon one of said elements and arranged to apply said clutch, a source of fluid pressure for said means, a rotatable valve adjacent said last-mentioned element and normally rotatable therewith as a unit, resilient means urging said valve and said last-mentioned element together, cam means cooperating with said resilient means in resisting relative angular movement between said valve and said last-mentioned element and tending to hold said valve and said last-mentioned element in one relative angular position, and means selectively operable to retard the rotation of said rotatable valve and effect a relative angular displacement between said valve and said last-mentioned element against the action of said cam means and said resilient means, said valve being operative in its first-mentioned relative position to supply fluid pressure to said fluid pressure actuating means and in its last-mentioned relative position to cut off said fluid supply to said fluid pressure actuating means to release said clutch.

5. In a power transmitting mechanism, a planetary gearset comprising a ring gear, a planet carrier supporting planet pinions meshing with said ring gear, and a sun gear meshing with said planet pinions, a supporting member carried by said sun gear and provided with a plurality of axially extending cylinders, a friction clutch arranged to lock said ring gear and said supporting member together, pistons in said cylinders for applying said clutch, a valve disc adjacent said supporting member, said valve disc and said supporting member having cooperating intake and exhaust ports therein, means normally holding said valve disc and said supporting member in a predetermined relative angular position with respect to each other and causing said disc and said member to rotate as a unit, selectively operable means for retarding said disc and effecting a relative angular movement between said disc and said member to a second predetermined relative angular position, said valve disc in said first-mentioned position supplying fluid pressure to said cylinders to apply said clutch and in said second-mentioned position cutting off said fluid supply and opening said cylinders to exhaust to release said clutch.

6. In a variable speed power transmission, in combination, a housing, a power shaft and a load shaft, a multiple planetary gearing system interposed between said power and load shafts, means associated with said planetary gearing system automatically operable under predetermined conditions to change from one speed ratio to another, an overrunning clutch engageable with one element of said multiple planetary gearing system, a brake drum operatively connected to said overrunning clutch, brake friction means engageable with said brake drum and adapted to retard the latter to condition said planetary gearing system to transmit torque in forward speed, a second brake drum associated with said planetary gearing system and adapted when retarded to condition said planetary gearing system to transmit torque in reverse speed, brake friction means engageable with said second brake drum, a third brake drum carried by said first-mentioned element of said planetary gearing system, brake friction means engageable with said third drum to retard the latter and overrule said overrunning clutch, hydraulic servo units for applying said brake friction means to said brake drums, a fluid pump for supplying fluid under pressure to said hydraulic servo units, and a manually operated valve for controlling the supply of fluid from said pump to said hydraulic servo units, said valve having fluid passages therethrough arranged in one position of said valve to prevent a flow of fluid to said hydraulic servo units, in a second position to supply fluid to the hydraulic servo unit of said first brake drum for forward speed operation, in a third position to supply fluid to the hydraulic servo unit of said second brake drum for reverse speed operation, and in a fourth position to supply fluid to the hydraulic servo unit of said third brake drum to overrule said overrunning clutch for downhill operation.

7. The structure of claim 6 which is further characterized in that said valve comprises a casing formed with a bore and with passageways communicating with said bore and with said hydraulic servo units, a member rotatable within said bore and having an axially extending passage communicating with said fluid pump to be pressurized therefrom, a pair of passageways in said member extending radially outwardly from said pressurized passage and arranged to selectively communicate with the passages in said casing in different angular positions of said valve, and manually operated means for rotating said member in said casing.

8. In a variable speed power transmission, in combination, a housing, a power shaft, an intermediate shaft, a load shaft, a fluid coupling arranged to transmit torque between said power and intermedite shafts, a multiple planetary gearing system arranged to transmit torque between said intermediate and load shafts, a power transmitting member between said power shaft and said multiple planetary gearing system, a pair of friction clutches arranged to respectively couple said power transmitting member to said power shaft and to said planetary gearing system, fluid pressure actuating means for applying said clutches, a fluid pump, conduits from said fluid pump to said actuating means, an accelerator operated valve controlling the flow of fluid through one of said conduits, a governor controlled valve controlling the flow of fluid through both of said condutis to selectively apply said clutches under certain speed conditions, a single planetary gearset interposed between said power and load shafts, a friction clutch between two of the elements of said planetary gearset, fluid pressure means for applying said friction clutch to lock said last-mentioned elements together to transmit torque through said planetary gearset at a unitary ratio, a conduit connecting said last-mentioned fluid pressure means with said pump, a valve controlling said conduit, brake friction means for operating said valve, a hydraulic servo unit for applying said brake, a conduit connecting said hydraulic servo unit with said accelerator operated valve, and passageways in said last-mentioned valve so arranged that in one position of said valve fluid pressure is supplied through said last-mentioned conduit to said hydraulic servo unit to disengage said last-mentioned clutch.

9. In a variable speed power transmission, a power shaft and a load shaft, a multiple planetary gearing system interposed between said power and load shafts and arranged for automatic selective operation to transmit torque at three different speed ratios, an auxiliary planetary unit between said power shaft and said multiple planetary gearing system arranged to transmit torque at a predetermined speed reduction, a clutch arranged to lock together two elements of said auxiliary planetary unit to transmit torque therethrough at a unitary ratio, control means normally rotatable with one of the elements of said auxiliary planetary unit, and accelerator controlled means for effecting relative rotation between said last named element and said control means to disengage said clutch so that said auxiliary planetary unit transmits torque at said predetermined speed ratio.

EUGENE J. FARKAS.

REFERENCES CITED

The following references are of record in the file of this patent:

UNITED STATES PATENTS

| Number | Name | Date |
| --- | --- | --- |
| 1,609,782 | Small | Dec. 7, 1926 |
| 1,839,088 | Normanville | Dec. 29, 1931 |
| 1,975,835 | Farkas | Oct. 9, 1934 |
| 2,205,470 | Dunn | June 25, 1940 |
| 2,242,276 | Vincent | May 20, 1941 |
| 2,328,392 | Neracher | Aug. 31, 1943 |
| 2,332,593 | Nutt et al. | Oct. 26, 1943 |
| 2,339,626 | Duffield | Jan. 18, 1944 |
| 2,343,955 | Cotterman | Mar. 14, 1944 |
| 2,349,410 | Normanville | May 23, 1944 |
| 2,381,786 | Tyler | Aug. 7, 1945 |
| 2,409,506 | McFarland | Oct. 15, 1946 |